| United States Patent [19] | [11] 3,974,092 |
|---|---|
| Streck et al. | [45] Aug. 10, 1976 |

[54] CATALYST FOR THE PREPARATION OF POLYALKENAMERS

[75] Inventors: Roland Streck; Heinrich Weber, both of Marl, Germany

[73] Assignee: Chemische Werke Huls Aktiengesellschaft, Marl, Germany

[22] Filed: Jan. 7, 1974

[21] Appl. No.: 431,371

Related U.S. Application Data

[62] Division of Ser. No. 150,193, June 4, 1971, Pat. No. 3,804,803.

[30] Foreign Application Priority Data

June 6, 1970  Germany............................ 2027905

[52] U.S. Cl. ............................ 252/429 B; 252/428; 252/430; 260/47 VA; 260/611 A; 526/140; 526/142; 526/159; 526/169; 526/308

[51] Int. Cl.² ............................................ C08F 4/22

[58] Field of Search ................. 252/429 B, 428, 430

[56] References Cited

UNITED STATES PATENTS

| 3,320,227 | 5/1967 | Bloyaert et al .............. 252/429 B X |
|---|---|---|
| 3,459,725 | 8/1969 | Natta et al. .................. 252/429 B X |
| 3,492,245 | 1/1970 | Calderon et al................ 252/429 B |
| 3,583,958 | 6/1971 | Sasaki et al. ................. 252/429 B X |
| 3,632,849 | 1/1972 | Pampus et al............... 252/429 B X |
| 3,798,175 | 3/1974 | Streck et al..................... 252/429 B |

*Primary Examiner*—Patrick P. Garvin
*Attorney, Agent, or Firm*—Millen, Raptes & White

[57] ABSTRACT

For the production of polyalkenamers there are provided catalysts consisting essentially of a catalyst system for the ring-opening polymerization of cyclic olefins consisting essentially of (1) a tungsten or molybdenum compound; (2) an organoaluminum compound; and (3) an ether of vinyl alcohol, of allyl alcohol, or of 2-butene-1,4-diol, the molar ratio of component (1) to component (2) being less than 1 : 1 and the molar ratio of component (1) to component (3) being less than 100 : 1. The catalyst system may also contain a compound containing one or more hydroxyl or sulfhydryl groups in a molar ratio to component (1) of about 0 : 1 to 2 : 1, respectively.

10 Claims, No Drawings

CATALYST FOR THE PREPARATION OF POLYALKENAMERS

This is a division of application Ser. No. 150,193, filed June 4, 1971, now U.S. Pat. No. 3,804,803, issued Apr. 16, 1974.

BACKGROUND OF THE INVENTION

This invention relates to a process for the preparation of polyalkenamers by the ring-opening polymerization of cyclic olefins employing a catalyst containing a metal of Subgroups 5 through 7 of the periodic table or a compound thereof and to novel polyalkenamers thus-produced.

It is known that cyclic olefins containing at least one unsubstituted ring double band can be polymerized under ring-opening conditions. The catalysts employed for this ring-opening polymerization are supported catalysts which contain a metal of Subgroups 5 through 7 of the periodic table, or the compounds thereof. See German published application DAS No. 1,072,811. Preferred catalysts are the reaction products of compounds of the above-mentioned metals with organometallic compounds or hydrides of metals of Main Groups 1 through 3 or Subgroup 2 of the periodic table, as well as optionally compounds which contain one or more hydroxy and/or sulfhydryl groups. See French Pat. Nos. 1,394,380 and 1,467,720; the published disclosures of Dutch patent application Ser. Nos. 65-10,331; 66-05,105; 66-14,413; 67-04,424; 68-06,208; and 68-06,211. The catalysts described therein contain compounds of molybdenum or tungstan and, as organometallic compounds, usually organoaluminum compounds. According to the published texts of Dutch patent application Ser. Nos. 67-14,559 and 68-06,209, vanadium, niobium, tantalum, rhenium, technetium, or manganese car. also be components of such catalyst systems.

In accordance with German unexamined published application DOS No. 1,909,226, it is also possible to employ catalyst systems containing a halide or an oxyhalide of molybdenum or tungsten wherein the stage of oxidation of the metal is 4, 5 or 6, an aluminum trihalide.

With the aid of these catalysts, a great variety of polymers can be prepared with structures which are strictly regular along the polymer chains, the structurue of the polymer units being exclusively dependent on the cycloolefin employed as the monomer. Thus, it is possible, for example, to produce linear polymers by the polymerization of monocyclic olefins; polymers having recurring polymer units containing a single ring by the polymerization of bicyclic olefins; and, in general, polymers having recurring polymer units which contain one ring less than the starting monomer by the polymerization of polycyclic olefins.

The polyalkenamers produced by the polymerization of monocyclic olefins are of particular interest for the additional reason that, depending on the cycloolefin employed, it is possible to prepare polymers having differing double bond content. Thus, polybutenamers which are free of vinyl groups, i.e., pure 1,4-polybutadienes, are obtained from cyclobutene, 1,5-cyclooctadiene, and 1,5,9-cyclododecatriene. Polypentenamers are obtained from cyclopentene which have three —$CH_2$-groups disposed between the double bonds. Polyoctenamers are produced from cyclooctene which correspond to a completely regular semihydrogenated 1,4-polybutadiene. Polydecenamers are prepared from cyclododecene corresponding to a two-thirds hydrogenated 1,4-polybutadiene in which remaining double bonds are arranged in the molecule at regular intervals. Accordingly, it is possible to produce polymers, the structures of which represent variations from pure 1,4-polybutadienes, free of vinyl groups, to strictly linear polyethylenes or polymethylenes.

It is likewise known that the average molecular weight or the degree of polymerization of a polymer affects properties of the polymer and thus its usefulness in any particular field of application, as well as its characteristics during the production and processing. Thus, polymer solutions of equal weight concentration of polymer are more viscous, the higher the molecular weight of the polymer in solution. Thus, difficulties are encountered with solutions of very high-molecular polymers, e.g., during the polymerization, for example, in the mixing or obtaining satisfactory heat exchange, and increased energy requirements for the agitating step result. Also, the further processing of very high-molecular polymers is difficult. For this reason, they are often degraded mechanically, chemically, or thermally prior to the final shaping procedure, e.g., injection-molding, extrusion, or calendering.

The polyalkenamers obtained during the ring-opening polymerization of cycloolefins are normally very high-molecular. Because of the above-described difficulties with polymers of very high molecular weight, attempts have been made in the prior art to develop processes for regulating the molecular weight of the polymers producible by a great variety of polymerization methods. In the polymerization of $\alpha$-olefins with organometallic mixed catalysts, the so-called hydrogen regulation, i.e., polymerization in the presence of a certain partial hydrogen pressure, proved useful. Other possibilities for controlling the molecular weight of $\alpha$-olefin polymers were varying the catalyst components, elevating the temperature or adding alkylzinc or alkylcadmium compounds during the polymerization.

Although organometallic mixed catalysts or related catalyst systems are also employed in the ring-opening polymerization of cycloolefins, the methods for molecular weight regulation employed in the polymerization of the $\alpha$-olefins either are unsuccessful or exhibit definite disadvantages which make the use of such methods difficult, if not impossible. Thus, hydrogen, for example, up to an excess pressure of 4 atmospheres exerts practically no influences at all on the molecular weight of the polyalkenamers prepared by the ring-opening polymerization of cycloolefins. Even if hydrogen were effective at pressures higher than those mentioned above, the hydrogen regulating method would require increased investment costs, since the plant would have to be designed for pressures which do not occur in the unregulated ring-opening polymerization of the cycloolefins which, under normal pressure, are present in the liquid phase or in solution at the polymerization temperature. Although the molecular weight of the polyalkenamers can be reduced by employing a higher polymerization temperature, the yield and the steric uniformity of the polymers are impaired in so doing. Moreover, due to the temperature sensitivity of the mixed catalysts customarily employed for the ring-opening polymerization of cycloolefins, such catalysts become inactive above 40°–50° C. in a short period. Also, modifications of an optimal catalyst system can strongly impair yield. See, for example, Dutch patent application Ser. No. 66-05,105, p. 16.

The last of the above-mentioned methods for controlling the molecular weight during the polymerization of α-olefins with organometallic mixed catalysts, i.e., using an alkylzinc or alkylcadmium compound as the controlling agent, is of little practical use, even if it were effective in the ring-opening polymerization of cycloolefins, because such zinc and cadmium compounds are very toxic and can be prepared only with difficulty and thus are expensive.

The only process heretofore known wherein polymers are obtained which exhibit improved processability is described in British patent No. 1,098,340. In this process, cyclic monoolefins are copolymerized under ring-opening in the presence of a conjugated diolefin, such as, for example, butadiene, isoprene, or 1,3-pentadiene. The thus-produced copolymers contain polymer units derived from both the cycloolefin and the conjugated diolefin, in varying molar ratios.

As shown in Comparative Experiments N through T in Table 3, conjugated dienes, although they influence the molecular weight of the polyalkenamers produced in polymerizations conducted in their presence, also are more or less strong catalyst poisons. Thus, for example, the presence of only 1 mol% of 1,3-butadiene, 5 mol% of isoprene, 5 mol% of 2,3-dimethyl-1,3-butadiene, or 10 mol% of 2,4-hexadiene, results in the complete inhibition of the polymerization catalyst and no polymer is obtained. Cyclic conjugated diolefins also cause a pronounced lowering of the yield of polymer. Moreover, it is not possible using such dienes as polymerization regulators to produce polymers which are waxy or oil-like products having very low molecular weights, e.g., about 500-5000.

In our prior filed U.S. application Ser. No. 10,497, filed Sept. 8, 1970, now U.S. Pat. No. 3,816,382, issued June 11, 1974 we claim a process for the regulation of molecular weight of polyalkenamers by the addition of monoolefins, preferably α-olefins, during the polymerization. The molecular weight of polyalkenamers can be regulated with a very high degree of success by this process. However, there is a great interest in polymers having functional terminal groups, which can be employed for further reactions, such as, for example, cross-linking reactions or for the construction of other defined polymer structures, e.g., block copolymers or stellate polymers. for example, a stellate structure is obtained by the reaction of a unilaterally lithium-terminated polymer, e.g., a polybutadiene or polystyrene produced in a polymerization which employs butyllithium as the catalyst, with a tri- or tetrahalogen compound, such as, for example, methyltrichlorosilane, silicon tetrachloride, or carbon tetrabromide. A chain of a polymer terminating at both ends in halogen can be reacted with a unilaterally metal-terminated chain of another polymer to form block copolymers. Polymer chains terminating in hydroxyl groups can be cross-linked with di-, tri-, or polyisocyanates or other polyfunctional compounds, such as, for example, acid chlorides of polybasic acids. These examples are typical but not complete and merely illustrate that such reactions of "telechelic polymers" (U.S. Pat. No. 3,244,664) have gained increasing importance in recent times. Functional end groups also often influence the practical application properties of the polymers and effect, for example, an improved adhesion to surfaces and/or an improved compatibility with other polymers. Thus, there is an increasing need for processes yielding polymers having defined functional end groups.

Accordingly, it is an object of the present invention to provide a process which makes possible, in a simple manner, to simultaneously regulate the molecular weight of polyalkenamers produced by the ring-opening polymerization of cyclic olefins and to introduce functional terminal groups into the polymer molecule. Another object is to provide novel polymers thus-produced. Other objects will be apparent to those skilled in the art to which this invention pertains.

SUMMARY OF THE INVENTION

According to this invention, the molecular weight of polyalkenamers produced by the ring-opening polymerization of cyclic olefins employing a catalyst containing a metal of Subgroups 5 to 7 of the periodic table is regulated by conducting the polymerization in the presence of an unsaturated ether wherein at least one of the carbon atoms bearing the double bond bears at least one hydrogen atom.

DETAILED DISCUSSION

The cyclic olefin and cycloolefin employed in the process of this invention are unsaturated hydrocarbons containing one or more rings, at least one of which contains at least one unsubstituted non-conjugated double bond.

The cycloolefins polymerized according to the process of this invention preferably contain 4 to 12 ring carbon atoms and a total of 4 to 20, preferably 4 to 15 carbon atoms; from 1 to 3, preferably 1 to 2 rings, which can be fused or separate cycloaliphatic rings; whose ring carbon atoms are unsubstituted or one or more which are substituted with lower-alkyl, e.g., of 1 to 4 carbon atoms, cycloalkyl, e.g., of 5 to 7 carbon atoms, or aryl, alkaryl or aralkyl, e.g., of 6 to 10 carbon atoms.

Preferred classes of starting cycloolefins are the following:

a. those containing 1 to 2 non-conjugated double bonds, preferably one;
b. those containing 1 to 2 rings, preferably one;
c. those of (a) and (b) containing two fused rings;
d. those of (a), (b), and (c) containing 0–2 lower-alkyl groups as the sole substituents on the ring carbon atoms, preferably 0;
e. those of (d) containing 1-2 methyl groups as the sole substituents on the ring carbon atoms;
f. those of (a), (b), (c), (d), and (e) wherein the unsaturated carbon atoms each bear a hydrogen atom; and
g. those of (a), (b), (c), (d), (e) and (f) wherein the ring of the cycloolefin containing the unsaturation contains 5 or 7 to 12 ring carbon atoms.

Examples of cycloolefins which can be polymerized according to the process of this invention are cyclobutene, cyclopentene, cycloheptene, cyclooctene, cyclononene, cyclodeoene, cycloundeoene, cyclododeoene, cis, cis-1,5-cyclooctadiene, 1-methyl-1,5-cyclooctadiene, 3,7-dimethyl-1,5-cyclooctadiene, 1,5,9-cyclododecatriene, 4,5-dimethyl-1,4,7-cyclodecatriene, cis, trans-1,5-cyclodecadiene, norbornene, dicyclopentadiene, dihydrodicyclopentadiene, and 4-phenylcyclooctene, and mixtures thereof. Cycloolefins which cannot be polymerized with ring-opening, e.g., cyclohexene and the derivatives thereof, are not employed as starting monomers in the polymerization process of this invention.

The polymerization of this invention is conducted in the presence, as a polymerization regulator, of an ether which contains a non-tertiary, acyclic isolated carbon-carbon double bond, i.e., an ether containing a non-conjugated carbon-carbon double bond joining carbon atoms which are acyclic carbon atoms and at least one of which bears at least one hydrogen atom. Preferably, both carbon atoms bear a hydrogen atom or one of the carbon atoms bears two carbon atoms. One or both of the ether radicals can bear the double bond, which can be $\alpha$, $\beta$ or more remote from the other group and centrally or terminally positioned in a branched or linear carbon chain, so long as at least one of the double bonded carbon atoms bears a hydrogen atom.

The unsaturated ether can be completely aliphatic, e.g., wherein the aliphatic group containing the unsaturation contains from 2 to 20, preferably 2 to 12, carbon atoms and the other aliphatic group contains 1 to 20, preferably 1 to 12, carbon atoms; one ether radical can be aliphatic and one cycloaliphatic, e.g., containing from 3 to 8, preferably 5 or 6, ring carbon atoms; or one can be aliphatic and one aromatic, e.g., containing 6 to 14, preferably 6 to 10, ring carbon atoms. Examples of aliphatic groups are alkyl, e.g., methyl, ethyl, butyl, or other lower-alkyl, octyl, dodecyl, or other higher alkyl. Examples of unsaturated alkyl are vinyl, allyl, crotyl, undecenyl and oleyl. Examples of cycloaliphatic are cyclopropyl, cyclopentyl, cylohexyl, p-methylcyclohexyl, m,m-dimethylcyclohexyl, cycloheptyl and cyclooctyl. Examples of aromatic are phenyl, o-tolyl, p-tolyl, sym.-xylyl, 2-chlorophenyl, 2,4-dichlorophenyl, 2,4,6-trichlorophenyl, p-methoxyphenyl and naphthyl. The unsaturated ether compound can contain one or more, e.g., 2, 3 or 4, ether groups.

The ether group can be the sole substituent, i.e., the compound is a hydrocarbon except for the ether group, or other non-reactive groups can be present in the molecule, e.g., aromatic halo, preferably chloro or bromo, trimethylsilyl, triethylstannyl.

Examples of unsaturated ethers are p-allyl anisole, methyl crotyl ether, 1,8-dimethoxy-1,7-octadiene, ethyl oleyl ether, phenyl undecen-(10)-yl ether, $\beta$-napthyl buten-(1)-yl ether, cinnamyl propyl ether, 1-phenoxy-8-butoxy-4-deocne, 3-methoxy-1-octene, cyclopentyl propenyl ether, ethylene glycol phenyl oleyl ether, or o-methoxystilbene. Of the unsaturated ethers, vinyl ethers and allyl ethers are preferred.

Examples of preferred ethers are vinyl alkyl ethers, including those wherein the alkyl group contains from 1 to 12 carbon atoms, e.g., vinyl methyl ether, vinyl isobutyl ether, vinyl n-butyl ether and vinyl lauryl ether, substituted alkyl vinyl ethers, e.g., vinyl chloromethyl ether and divinyl ether. Examples of allyl ethers are the allyl alkyl ethers wherein the alkyl group contains from 1 to 12 carbon atoms, e.g., allyl methyl ether, diallyl ether and substituted ethers, e.g., tetrabromohydroquinone diallylether, vinyl allyl ether, and ethers of alkanediols, e.g., 2-butene-1,4-diol, such as, for example, 1,4-dimethoxy-2-butene, 1-methoxy-4-ethoxy-2-butene, 1-ethoxy-4benzyloxy-2-butene and 1-isopropoxy-4-allyloxy-2-butene. Ethers of vinyl alcohol, allyl alcohol and 2-butene-1,4-diol are preferred.

Of the ethers of vinyl alcohol, allyl alcohol, and 2-butene-1,4-diol, the phenol ethers are especially preferred, particularly the ethers of halogenated, e.g., chlorinated and/or brominated, phenols. Representative examples of the latter are vinyl 2,4,6-tribromophenyl ether, vinyl p-chlorophenyl ether, vinyl p-chloro-o-bromophenyl ether, vinyl, 2,3,5,6-tetrabromo-p-cresyl ether, allyl 2-chlorophenyl ether, allyl 2,4ether, allyl pentachlorophenyl ether, allyl 2,4,6-tribromophenyl ether, 1,4-bis(2,4,6-tribromophenoxy)-2-butene, 1-methoxy-4-(p-bromophenoxy)-2-butene, 1-(p-bromophenoxy)-4-(o-fluorophenoxy)-2-butene and 1-($\beta$-chloroethoxy)-4-(2,4,6-tribromophenoxy)-2-butene.

When unsaturated ethers are employed as the controlling agents which bear an alkoxy group on one side only of the double bond, e.g., vinyl methyl ether, the resulting polymers possess, on the average, one alkoxy group per macromolecule. However, macromolecules can also occur which have no alkoxy end group or two alkoxy end groups. Macromolecules with two alkoxy end groups are always obtained when using controlling agents carrying alkoxy groups on both sides of the double bond, for example, when using 1,4-dimethoxy-2-butene, 1,6-bis(4-bromophenoxy)-3-hexene, p,p'-dimethoxystilbene or 1-phenoxy-8-butoxy-4-decene.

A surprising characteristic of the ethers of vinyl alcohol, allyl alcohol, and 2-butene-1,4-diol, especially the ethers of these alcohols with phenols, especially halogenated phenols, is that exert, in very small quantities ranging on the order of magnitude of catalyst concentration, a favorable influence on the rate and yield of the polymerization, as well as effecting molecular weight control. This activator effect cannot be explained by means of any of the heretofore known theories regarding the mechanism of the ring-opening polymerization of cyclic olefins.

With the aid of these activators, it is also possible to develop catalyst systems based on tungsten hexachloride and ethylaluminum sesquichloride or diethylaluminum chloride, which normally exhibit only minor catalytic activity, which are highly satisfactory polymerization catalysts. Ethylaluminum dichloride containing catalysts, which have heretofore shown the highest activity, is manufactured in smaller quantities than the two other above-mentioned ethylaluminum halogenides and, moreover, can be handled only in dilute solutions, due to its melting point of +32° C. Furthermore, catalysts containing ethylaluminum dichloride have a strong tendency to promote secondary reactions of a cationic type. Thus, for example, they have an alkylating effect on aromatics and polymerize branched olefins, which can result in gelling.

By employing the "activating regulators" or "regulating activators" of this invention, a considerable increase in catalyst activity is always attained, even in the case of catalysts containing ethylaluminum dichloride, so that high conversion rates can be obtained, even when the polymerization is conducted in dilute solutions, which reaction ordinarily progresses very unsatisfactorily, especially in case of cyclopentene. This is also advantageous from the viewpoint of process technique, for it is possible to polymerize a high proportion of the monomer rather than being forced, as in case of bulk polymerization, to utilize the monomer as the solvent and work with small conversions, due to the viscosity of the thus-produced polymer solution, and to regenerate and recycle the larger portion of the monomer. Besides, especially in the case of cyclopentene, the polymerization need no longer be conducted at the very uneconomical low temperatures of −20° to −30° C. Instead, the same or even still higher yields are obtained under conditions which are technically and economically more advantageous (0° to 20° C).

The ring-opening polymerization of cyclic olefins can be conducted by conventional procedures employing known catalysts. Thus, suitable catalysts are supported catalysts containing the metal of Subgroups 5 through 7 of the periodic table, for example, in the form of the carbonyl, sulfide, or superficially reduced oxide on a support such as, for example, aluminum oxide, aluminum silicate, or silica gel. Also suitable are mixed catalysts, e.g., containing a compound of a metal of Groups 5 through 7 of the periodic table and an organometallic compound or hydride of a metal of Main Groups 1 through 3 or Subgroup 2 of the periodic table and optionally, also a compound containing one or more hydroxy and/or sulfhydryl groups. Also suitable are catalysts containing a halide or oxyhalide of molybdenum or tungsten wherein the degree of oxidation of the metal is 4, 5, or 6, and which contain an aluminum trihalide. Preferably, mixed catalysts are employed containing a molybdenum compound or especially a tungsten compound. Preferred organometallic compounds are organolithium, organomagnesium and organoaluminum compounds, especially methylaluminum dichloride, ethylaluminum dichloride, methylaluminum sesquichloride, ethylaluminum sesquichloride, dimethylaluminum chloride and diethylaluminum chloride. Compounds containing one or more OH— and/or SH-groups optionally can be employed concomitantly as a catalyst component, e.g., water, hydrogen sulfide, hydroperoxide, alkyl hydroperoxides, mercaptans, hydrodisulfides, alcohols, polyalcohols, polymercaptans and hydroxymercaptans. Saturated and unsaturated alcohols and phenols, viz., n-propanol, n-butanol, sec.-butanol, isobutanol, allyl alcohol, crotyl alcohol, phenol, o-m m-, and p-cresol, $\alpha$ - and $\beta$-naphthol, eugenol and benzyl alcohol, especially methanol, ethanol, isopropanol, or tert.-butanol, are preferred. However, when employing an "activating regulator" according to this invention, compounds containing OH— and/or SH-groups offer only minor advantages and can be omitted.

The polymerization can be conducted continuously or discontinuously. The reaction temperature can vary widely, e.g., between −70° C. and +50° C. However, temperatures between −30° and +30° C. are preferred.

The amount of regulator which is added and, as a consequence, the molecular weight of the polymers produced, can be varied widely without any disadvantages effects on the yield and the stereospecificity of the polymerization. When employing, for example, cyclobutene or cyclopentene as the monomer, it is thus possible to produce rubber-like products of a high Mooney viscosity, which can be extended with a large amount of oil, as well as other readily processable rubber types.

It is also possible to manufacture highly tacky products of low viscosity and syrupy to oily liquids which can be utilized, for example, as drying oils directly, or after an additional reaction, as binders for varnishes or coating agents.

The amount of regulator needed to attain a product of a specific consistency depends, inter alia, on the type of the monomer employed, the type of regulator employed, the catalyst employed, and the selected polymerization reaction conditions. The exact amount of regulator can readily be determined by a few preliminary experiments.

The amount of unsaturated ether employed can vary from about 0.001–20 molar percent, based on the monomer. Generally, the use of about 0.001–5, preferably about 0.003–5, more preferably about 0.01–5 mol-percent, and most preferably about 0.05–2 mol-percent, of unsaturated ether, based on the monomer employed, results in the production of polyalkenamers having molecular weights in the range of commercial elastomers or thermoplastics. The addition of between about 6 and 20 molar percent, preferably between about 7 and 15 mol-percent of the regulator, based on the monomer employed, generally is required for the production of low-viscosity to oily products.

These data apply when using regulators which do not simultaneously increase the polymerization velocity and the polymer yield. In contrast thereto, when using "activating regulators," about one-tenth of the above quantities often is sufficient for the preparation of polyalkenamers having molecular weights in the range of commercial elastomers or thermoplastics.

It is to be noted that the unsaturated ethers, as Lewis bases (electron donors), form complexes with the other components of the catalyst and thereby can inactivate the latter. Therefore, it is necessary to employ these compounds either in the form of complexes with Lewis acids or to ensure, by an appropriate dosing of the organometallic compound, that the catalyst is always present in an excess of the oxygen atoms which are effective as electron donors in the regulator compound employed. Otherwise, no polymerization takes place.

Since the activating effect of the ethers of vinyl alcohol, allyl alcohol, and 2-butene-1,4-diol, especially the ethers of these alcohols with phenols and particularly with halogenated phenols, is clearly perceptible with the addition of a very small amount thereof, e.g., approximately 1 molar percent of the heavy metal component of the catalyst, especially in case of tungsten compounds and particularly in case of tungsten hexachloride, these "activating regulators" can also be considered to be components of the catalyst system and can be employed primarily for the purpose of improving yield. Any desired reduction of the molecular weight of the polymer lower than it would be obtained with the use of these additives by themselves, can be achieved by the additional use of other regulators, for example the previously proposed $\alpha$-olefins. This combination of "activating regulators" and $\alpha$-olefins is particularly advantageous when very low-molecular products are to be manufactured, e.g., oils, and no importance is attributed to functional end groups of the polymer because such end groups would not offer any special advantage for the intended purpose for which the products are to be used.

The polymerization process of this invention is preferably conducted in solution. For this purpose, invert solvents inert under the reaction conditions are employed, e.g., benzene, cyclohexane, methylcyclohexane, isopropylcyclohexane, "Decalin", hydrogenated kerosene, paraffin oil, methylene chloride, trichloroethylene and preferably hexane, heptane, octane, and perchlorethylene. The amount of solvent employed can vary widely, e.g., 5 to 2,000% by weight, preferably 50 to 1,000% by weight, based on the monomer employed. Low-molecular oily polymers can alos advantageously be prepared without a solvent by mass polymerization, so long as the viscosity of the thus-reacted mixture remains reasonably low.

The amount of catalyst which need be employed is very low. For example, in case of tungsten hexachloride, only about 0.5 – 2 millimols per liter of reaction volume, or about 1 mol per 1,000–5,000 mols of monomer, is required. When using an "activating regulator," this quantity can be reduced to approximately one-tenth the amount, in spite of the improved yield. The concentration of organometallic catalyst component depends primarily on the purity of the monomer and the solvent employed, i.e., the amount of moisture, peroxides, proton-active impurities, such as alcohols, acids, and other compounds reacting with alkyl metals, such as ethers, amines, ketones, aldehydes, etc., present therein. When the monomer and the solvent are subjected to a very thorough preliminary purification and the reactants are handled with strict exclusion of air in thoroughly dried reactors, molar ratio of heavy metal compound to active alkyl metal, i.e., an alkyl metal which has not been bound or destroyed by impurities or any additional additives present, of about 1:4 to 1:1, preferably less than 1:1, is generally sufficient. Outside of this range, the catalysts are normally less active.

As in the case of regulating the molecular weight of polyalkenamers with monoolefins, surprisingly it is not necessary in the process of this invention that the regulator be present at the beginning of the polymerization in order to obtain the desired effect. The regulator can, if desired, be added after polymerization has begun. All that is required is that the catalyst is still active, i.e., the regulator must be added prior to the inactivation of the catalyst. It is thus possible to use regulators which tend to form homopolymers which are insoluble in the reaction mixture if exposed to the catalyst, either by themselves or in a mixture with cycloolefins at the beginning of the polymerization, and thus inactivate the catalyst by inclusion in the insoluble polymer, or which enter into secondary reactions with the catalyst components prior to the actual formation of the catalyst, but which do not react in such a manner with the finished catalyst. The tendency of a regulator to promote homopolymerization or enter into such secondary reactions can quickly be determined by preliminary experiments. Because of this characteristic, it is also possible when an unforeseen rise in the viscosity of a polymerization batch takes place, as occasionally happens, to keep the contents of the kettle stirrable by adding the regulator before inactivation of the catalyst, thus avoiding the extensive work connected with emptying a batch which has become too viscous or even gelled.

The preferred catalyst systems employed in the polymerizations of this invention are novel systems comprising
1. a tungsten or molybdenum compound;
2. an organoaluminum compound;
3. an ether of vinyl alcohol, of allyl alcohol or of 2-butene-1,4-diol; and, optionally,
4. a compound containing one or more hydroxyl and sulfhydryl groups.

Preferred aspects of the catalyst systems of this invention comprise one or more of any of the following:
a. component (1) is tungsten hexachloride or tungsten oxytetrachloride;
b. component (2) is an alkyl aluminum halide, preferably ethylaluminum dichloride, ethylaluminum sesquichloride or diethylaluminum monochloride;
c. component (3) is a phenol ether of vinyl alcohol, of allyl alcohol or of 2-butene-1,4-diol, preferably a halogenated phenol;
d. the molar ratio of component (1) to component (2) is less than 1:1;
e. the molar ratio of component (1) to component (3) is less than 100:1, preferably less than 10 : 1.
f. the molar ratio of component (1) to component (4) is about 1:0.1 to 1:2;
g. the molar ratio of component (2) to component (3) is greater than 1:1; and/or
h. the molar ratio of component (1) to the difference of the amounts employed of component (2) minus the sum of components (3) and (4) is between about 1:1 and 1:4.

After the termination of the polymerization reaction, the polyalkenamers can be isolated and purified in a conventional manner. If the polyalkenamers are obtained in solution or in the liquid phase, the residues of the catalyst can be removed with an alcohol or other compound having an acidic hydrogen, by washing out the polymer-containing phase with an aqueous or aqueous-alcoholic solution of agents having a dissolving effect on the catalyst residues, which latter are first present as an alcoholate or a salt of the other compound having an acidic hydrogen atom used to remove the catalyst. Such substances with a dissolving effect on the catalyst are, for example, acids, bases, or complex-forming agents, such as acetylacetone, citric or tartaric acid, ethylenediaminetetraacetic acid, nitrilotriacetic acid, etc.

After the catalyst has been removed, the polymers are separated by precipitation, e.g. by pouring into a precipitant such as, for example, methanol, isopropanol, or acetone, or distilling off the solvent, e.g., by blowing in steam, or by introducing the polymer solution through nozzles into hot water. When the polymer can be precipitated from the solution of the monomer in the form of flakes or a powder, the polymer can first be separated, e.g., by filtration, centrifuging, or decanting from the liquid and thereafter treated to remove the catalyst residues.

In order to protect the polyalkenamers against oxidation, gelling, and other aging phenomena, it is possible to add stabilizers thereto, e.g., aromatic amines or the sterically hindered phenols, at various stages of processing. Also, an optional further purification step can be conducted by reprecipitating the polymer if this should be necessary, to obtain a product of the desired purity. After these operations, the polymer can then be dried in a conventional manner.

In contrast to the previously known polyalkenamers which, although called linear polymers, in reality, are macrocyclic compounds, the polyalkenamers prepared in accordance with the process of this invention are truly linear polymers of a strictly regular structure with exactly defined terminal groups. Such polymers have not heretofore been produced.

The polyalkenamers produced in accordance with the process of this invention are, in contrast to the polymers known heretofore which although called linear polymers are in reality macrocyclic compounds, true linear polymers of a strictly regular structure with exactly defined end groups, which have not been described heretofore.

By the ring-opening homopolymerization according to the process of this invention of monocyclic monoolefins of the general Formula I

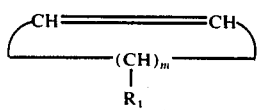

polymers of the general Formula II are obtained:

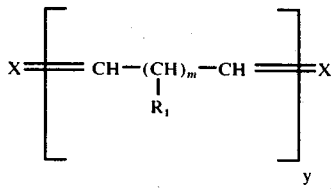

wherein in both instances $R_1$ is hydrogen or a straight-chain or branched saturated alkyl of 1–6 carbon atoms, saturated cycloalkyl of 3–6 carbon atoms or aryl of 6–10 carbon atoms, and X, m and y have the values given below.

The various

groups in the molecule can be alike or different, i.e., $R_1$ can be hydrogen in every instance in the molecule so that the number of $R_1$ groups which are hydrogen is $m$ or from 1 to $m$ of the $R_1$ groups can be alkyl or aryl. Thus, by the ring-opening homopolymerization of unsubstituted monocyclic monoolefins, i.e., compounds of the general Formula I wherein $R_1$ is hydrogen, there are obtained polymers of the general Formula III:

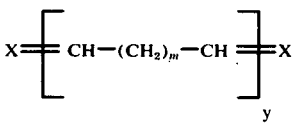

wherein X, Y and m have the values given below.

By the ring-opening homopolymerization of monocyclic diolefins of the general Formula IV

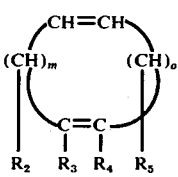

there are obtained polymers of the general Formula V

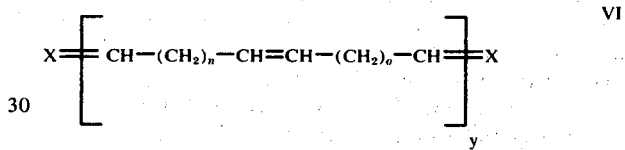

wherein, in Formulae IV and V, X, y and o have the values given below, and $R_2$, $R_3$, $R_4$ and $R_5$, which are alike or different, have the same values as $R_1$. Thus, $R_2$ and/or $R_5$ groups can be disposed throughout the polymer molecule. In other words, n of the $R_2$ groups and/or o of the $R_5$ can be hydrogen or 1 to $n$ of the $R_2$ groups and/or 1 to o of the $R_5$ groups can also be alkyl or aryl, respectively. The same applies to $R_3$ and/or $R_4$ groups, which likewise can both be hydrogen or either or both can also be identical or different alkyl or aryl groups. Thus, by the ring-opening homopolymerization of unsubstituted monocyclic diolefins of Formula IV wherein $R_2$, $R_3$, $R_4$ and $R_5$ are hydrogen, there are obtained polymers of the general Formula VI.

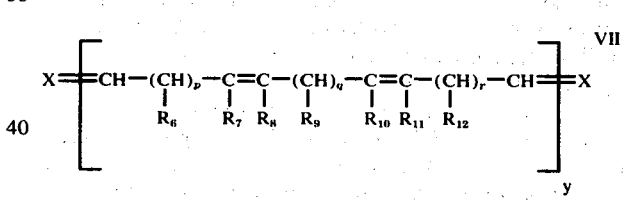

Homopolymers of the general Formula VII

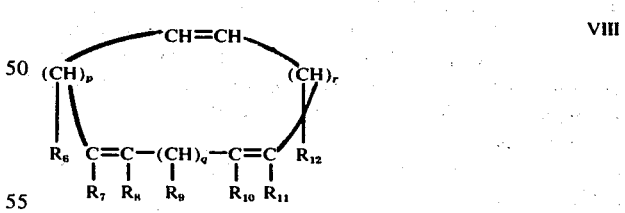

are produced by the ring-opening polymerization of monocyclic triolefins of the general Formula VIII wherein X and Y have the values given below and $R_6$, $R_7$, $R_8$, $R_9$, $R_{10}$, $R_{11}$, and $R_{12}$, which can be alike or different, have the same values as $R_1$. The various $R_6$, $R_9$ and/or $R_{12}$ groups can be identical or different groups, i.e., all $p$ of the $R_6$ groups, all $q$ of the $R_9$ groups and/or all $r$ of the $R_{12}$ groups can be hydrogen; or from 1 to $p$ of the $R_6$ groups, 1 to $q$ of the $R_9$ groups and/or 1 to $r$ of the $R_{12}$ groups can, respectively, be an alkyl or aryl group. The same is true of the $R_7$, $R_8$, $R_{10}$ and/or $R_{11}$, which likewise can all represent hydrogen, or individually or severally, can be identical or different alkyl or aryl groups.

By the ring-opening homopolymerization of norbornene there are obtained polymers of the general Formula IX

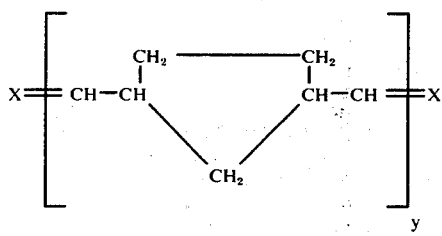

wherein X and y have the values given below.

Polymers containing two or more of the above-described polymer units in a statistical distribution or in larger block sequences are produced during the ring-opening copolymerization of two or more of the above-described cycloolefins in the presence of the claimed polymerization regulators.

In Formulae II, III, V, VI, VII and IX, m is the integer 2 or 3 or an integer from 5 to 10 inclusive; n and o each integers from 1 to 7, the sum of which is an integer from 3 to 8; p, q, and r each are the integer 1 or 2; and y is an integer from 2 to about 50,000, preferably 5 to about 20,000.

The novel polyalkenamers of this invention are characterized structurally by their novel terminal groups. These groups are alkylidene radicals derived from the unsaturated ether employed in the polymerization as the polymerization regulator. Thus, in Formulae II, III, V, VI, VII and IX, X is an alkylidene residue corresponding to one of the segments of the unsaturated ether employed during the polymerization wherein the division of the unsaturated ether is effected at the double bond, e.g. an unsaturated ether of the formula $$CH_3-O-CH_2-CH=CH_2$$

may be divided in the segments $$CH_3-O-CH_2-CH=$$

and $=CH_2$.

Both segments represent an alkylidene residue.

The solid polymers or oligomers of the general Formulae II, III, V, VI, VII, and IX exhibit RSV-values (reduced specific viscosity values) of 0.01 – 10.00 dl/g. The low-molecular weight fluid polymers have average molecular weights in the range of about 500 to 25,000. Average molecular weights mean the arithmetic means of the molecular weights.

In former publications Natta and Dall'Asta stated (Angew. Chem. 76, 765 (1964) and J. Pol. Sci. 6,2405 (1968) that polyalkenamers prepared by ring-opening polymerization of cycloolefins have a strictly linear structure. Later on Calderon alleged that those polyalkenamers are in reality macrocyclic compounds (J. Am. Chem. Soc. 90, 4133 (1968)). This proposition was proved by isolation and identification of macrocyclic oligomers with polymerization rates up to 11 (Adv. Chem. Scr. 91, 399 (1969)).

The novel polyalkenamers can unexpectedly and readily be worked up, as they have a lower reduced melt viscosity. Therefore they may be worked up by lower temperature, e.g., by calendering, rolling or injection moulding, whereby the energy-costs are much smaller.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. Unless stated otherwise, the reduced specific viscosity (RSV) and the gel contents were determined in benzene at 25° C.

EXAMPLES 1–15 AND COMPARATIVE EXPERIMENTS A–E

Into a three-tube 1-liter glass flask with agitating unit and reflux condenser with a dropping funnel attached thereto were introduced, respectively, 100 ml. (77.8 g.) of cyclopentene and 150 ml. of hexane and were brought under an atmosphere of extremely pure nitrogen, to the reaction temperature by cooling or heating, and are mixed with the components of the polymerization catalyst. After the predetermined reaction period, the catalyst was destroyed by the addition of 50 ml. of methanol containing 3 g. of potassium hydroxide and 2 g. of 2,6-di-tert.-butyl-p-cresol ("IONOL"). After the addition of 100 ml. of distilled water and 50 ml. of methanol, so that a second phase containing 50% methanol was formed, the reaction mixture was then further agitated for three hours, to wash out the catalyst residues. The aqueous-methanolic phase was then removed by pipetting and the reaction mixture was washed twice with 50% aqueous methanol. The polymer was then precipitated by pouring the organic phase into 3 liters of methanol. The precipitated product was dissolved once again in 250 ml. of hexane, for purposes of an additional purification, and reprecipitated with methanol to which was again added 2 g. of stabilizer ("IONOL"). After decocting the polymer for 2 hours with 500 ml. of pure methanol, it was dried for 40 hours at 50° C. in a vacuum drying chamber. The thus-purified polymer was employed for determining the yield and the analytical data. In each case, such a blank test (designated in the table by captial letters) was conducted to exclude sources of errors due to changing impurities in the solvent, the monomer, or the catalyst components, in parallel to the polymerizations employing one of three regulator olefins (numbered examples). The regulators to be tested were admixed with the monomers in the examples. In Table 1, the amount of regulator is set forth in molar percent, based on the monomer employed.

TABLE 1

Polymerization of cyclopentene (100 ml. = 77.8 g. per experiment) in hexane (150 ml. per experiment).
Catalyst system: 0.5 millimol of tungsten hexachloride/0.5 millimol of ethanol/changing amounts of ethylaluminum dichloride.
Polymerization temperature: 0°C.     Polymerization time: 2.5 hours.

| Experiment No. | EtAlCl₂ in the Catalyst (mmol) | Regulator Amount (mol %) | Regulator Name | Polymer Yield (g) | RSV (dl/g) | Trans-content (%) | Gel (%) |
|---|---|---|---|---|---|---|---|
| A  | 3     | —     | —                                   | 11.3 | 3.3  | 91  | 3  |
| 1  | 14.4  | 1.0   | Allyl phenyl ether                  | 43.1 | 0.48 | 86  | 3  |
| 2  | 14.4  | 1.0   | Allyl 2-chlorophenyl ether          | 46.0 | 0.48 | 88  | 2  |
| 3  | 14.4  | 1.0   | Allyl 2,4-dichlorophenyl ether      | 49.2 | 0.55 | 86  | 4  |
| B  | 3     | —     | —                                   | 13.2 | 3.8  | 91  | 5  |
| 4  | 14.4  | 1.0   | Vinyl pentachlorophenyl ether       | 35.7 | 1.7  | 92  | 3  |
| 5  | 14.4  | 1.0   | Allyl 2,4,6-tribromophenyl ether    | 54.1 | 0.38 | 89  | 4  |
| 6  | 14.4  | 1.0   | Allyl pentachlorophenyl ether       | 65.2 | 0.44 | 83  | 2  |
| C  | 2     | —     | —                                   | 8.3  | 5.89 | 73  | 2  |
| 7  | 2.05  | 0.005 | Allyl 2,4,6-tribromophenyl ether    | 36.8 | 3.30 | 100 | 2  |
| 8  | 2.25  | 0.025 | "                                   | 49.0 | 1.80 | 89  | 2  |
| 9  | 2.50  | 0.050 | "                                   | 53.2 | 1.38 | 88  | 2  |
| D  | 3     | —     | —                                   | 8.2  | 3.70 | 81  | 3  |
| 10 | 14.4  | 1.0   | Vinyl n-butyl ether                 | 9.2  | 2.80 | 72  | 14 |
| 11 | 14.4  | 1.0   | Vinyl lauryl ether                  | 10.3 | 2.75 | 74  | 3  |
| 12 | 25.8  | 1.0   | 1,8-Dimethoxy-1,7-octadiene         | 6.6  | 2.0  | 80  | 13 |
| E  | 3     | —     | —                                   | 7.1  | 4.1  | 90  | 5  |
| 13 | 25.8  | 1.0   | 1,4-Dimethoxy-2-butene              | 21.7 | 3.5  | 76  | 12 |
| 14 | 25.8  | 1.0   | 1,4-Bis(2,4,6-tribromophenoxy)-2-butene | 53.6 | 0.40 | 96  | 2  |
| 15 | 14.4  | 1.0   | Methyl allyl ether                  | 31.5 | 1.8  | 81  | 2  |

EXAMPLE 16 AND COMPARATIVE EXPERIMENT F

Copolymerization of Cyclopentene and Cyclododecene 50 ml. (38.9 g.) of cyclopentene and 50 ml. (43.5 g.) of cyclododecene were diluted with 150 ml. of hexane and cooled to 0° C. Then, 0.5 millimol of tungsten hexachloride, 0.5 millimol of ethanol, 3.5 millimols of ethylaluminum dichloride, and 0.5 millimol of allyl 2,4,6-tribromophenyl ether were added thereto under agitation. After 2.5 hours, the catalyst was decomposed in the manner described in Examples 1–15. The polymer was worked up in the manner described therein. There was obtained 34.3 g. of a polymer having an RSV of 0.85 dl./g. The polymer contained 74.6 molar percent of polypentenamer units (determined by nuclear resonance analysis) with the remainder being polydodecenamer units. 85% of the double bonds thereof detectable by ultrared spectroscopy was present in the trans-configuration.

In a comparative experiment wherein the allyl 2,4,6-tribromophenyl ether and the amount of ethylaluminum dichloride required for compensating the donor effect of the ether oxygen thereof (0.5 millimol) were omitted, there was obtained only 0.7 g. of product.

It can be seen from this experiment that the polymerization of cyclopentene at 0° C. is strongly inhibited by the simultaneous presence of cyclododecene. However, the addition of an activating regulator, in this case, allyl 2,4,6-tribromophenyl ether, overcomes this inhibition and makes possible the production of copolymers in high yield.

Similar results are likewise obtained by replacing the cyclododecene in the above example by cyclooctene and/or by replacing the allyl 2,4,6-tribromophenyl ether by vinyl pentachlorophenyl ether.

EXAMPLES 17 AND 18 AND COMPARATIVE EXPERIMENTS G AND H

Use of Ethylaluminum Sesquichloride 100 ml. (77.8 g.) of cyclopenetene was diluted with 400 ml. of hexane and cooled to 0° C. Thereafter, 0.5 millimol of tungsten hexachloride, 0.5 millimol of ethanol, 4 millimol of ethylaluminum sesquichloride, and 0.5 millimol of allyl 2,4,6-tribromophenyl ether were added under agitation. After a reaction time of 2.5 hours, the catalyst was decomposed in the manner described in Examples 1–15. Working up the polymer in the manner described therein, there was obtained 51.5 g. of a polypentenamer having a reduced specific viscosity of 0.97 dl./g. and a gel content below 2%. Of the double bonds thereof detectable by ultrared spectroscopy, 88% were present in the trans-configuration.

The yield (49.2 g.) was not substantially altered by omitting the ethanol.

A comparative experiment (G) with ethanol, but without allyl tribromophenyl ether, resulted in only 19.7 g. of polymer.

An otherwise identical further comparative experiment (H) wherein the catalyst contained only tungsten hexachloride and ethylaluminum sesquichloride (same amounts as above) yielded only 4.4 g. of polymer.

EXAMPLE 19 AND COMPARATIVE EXPERIMENT J

Use of Diethylaluminum Chloride

An experiment was conducted in the same manner as Comparative Experiment G except, in place of the ethylaluminum sesquichloride, the same molar amount of diethylaluminum chloride was employed in addition to 0.5 millimol of ethanol. There was obtained 7.9 g. of polypentenamer.

By replacing the ethanol by the same molar quantity of allyl 2,4,6-tribromophenyl ether, the yield was raised to 43.3 g. of polypentenamer, with a reduced specific viscosity of 3.60 dl./g. and a 2% gel content. Double bonds detectable by infrared spectroscopy were present to an extent of more than 95% in the trans-configuration.

The above examples demonstrate that, with the use of the ethers of vinyl alcohol, of allyl alcohol, and of 2-butene-1,4-diol, respectively, with phenols and halogenated phenols, the results heretofore attainable with the previously best catalysts disclosed are surpassed. Furthermore, as the organometallic component of the catalyst system, ethylaluminum sesquichloride or diethylaluminum chloride can be used, which compounds can be handled more easily and are less expensive.

that the solutions, prior to the polymerization, contained 20% by volume of cyclooctene or cyclododecene or 10% by volume of 1,5-cyclooctadiene.

The polymers were worked up in the manner described above and then analyzed.

TABLE 2

Polymerization of various cycloolefins.
Catalyst system: 0.5 millimol of tungsten hexachloride/0.5 millimol of ethanol/changing quantities of ethylaluminum dichloride.
Polymerization temperature 20° C.

| Ex. No. | Monomer | (ml.) | (g.) | EtAlCl$_2$ in the Catalyst (mmol) | Polymerization Time (hours) | (mol-%) | Regulator Name | Yield (g) | Polymer RSV (dl/g) | Trans-content (%) | Gel (%) |
|---|---|---|---|---|---|---|---|---|---|---|---|
| K | Cyclooctene | 100 | 84 | 3 | 0.25 | — | — | 63.8 | 3.62 | 54 | — |
| 20 | | | | 3.8 | 0.25 | 0.1 | Allyl 2,4,6-tribromophenyl ether | 75.9 | 3.45 | 54 | — |
| 21 | | | | 10.6 | 0.25 | 1.0 | Methyl allyl ether | 24.3 | 3.14 | 23 | — |
| 22 | | | | 18.2 | 0.25 | 2.0 | Vinyl isobutyl ether | 21.7 | 2.22 | 42 | — |
| L | Cyclododecene | 100 | 87 | 3 | 2.5 | — | — | 44.4 | 1.84 | 40 | — |
| 23 | | | | 12 | | 1 | Phenyl allyl ether | 32.6 | 1.06 | 54 | — |
| 24 | | | | 12 | | 1 | 2-Chlorophenyl allyl ether | 40.9 | 0.77 | 44 | — |
| 25 | | | | 12 | | 1 | 2,4-Dichlorophenyl allyl ether | 49.7 | 0.64 | 47 | — |
| M | 1,5-Cyclooctadiene | 100 | 87.7 | 3 | 0.25 | — | — | 54.3 | 3.3 | 38 | 2 |
| 26 | | | | 7.1 | | 0.5 | Methyl allyl ether | 14.5 | 1.7 | 56 | 5/6 |
| 27 | | | | 19.2 | | 2.0 | " | 34.5 | 0.66 | 29 | 4/6 |
| 28 | | | | 43.6 | | 5.0 | " | 22.0 | 0.34 | 21 | <2 |

In Examples 20–25 and in Comparative Experiments K and L, the RSV-values were measured in "Decalin" at 135° C.

EXAMPLES 20–28 AND COMPARATIVE EXPERIMENTS K–M

Polymerization of Various Cycloolefins (See Table 2)

Examples 20 to 28 and Comparative Experiments K through M were conducted in accordance with the mode of operation set forth for Examples 1–15 and Comparative Experiments A–E. The solvent, in all cases, was technical hexane (boiling point limits: 68°–70° C.). The amount of the hexane was chosen so

SERIES OF COMPARATIVE EXPERIMENTS N THROUGH T

The series of Comparative Experiments N through T were conducted in accordance with the mode of operation set forth for Examples 1–12 and Comparative Experiments A through E. For each experiment, 100 ml. (87.5 g.) of cyclododecene was employed as the monomer and 150 ml. of technical hexane (boiling point limits: 68°–70° C.) was used as the solvent. The various conjugated dienes were employed in differing quantities as set forth in Table 3. As the catalyst for each experiment, 0.5 millimol of tungsten hexachloride, 0.5 millimol of ethanol, and 3 millimols of ethylaluminum dichloride were employed. The polymerization period in all the experiments was 2.5 hours at 20° C. The polymers were worked up in the manner described above and then analyzed.

TABLE 3

| Experiment Series No. | Conjugated Diolefin Name | Mol-% | Yield g. | Polymer % | RSV dl/g | Trans % |
|---|---|---|---|---|---|---|
| N | 1,3-Butadiene | — | 21.9 | 25.2 | 1.96 | 40 |
| | | 1 | 0.8 | 0.9 | 0.30 | 40 |
| | | 5 | 0.2 | 0.2 | 0.06 | ) too little |
| | | 10 | 0.3 | 0.3 | 0.07 | ) substance |
| O | Isoprene | — | 46.1 | 53.0 | 2.25 | 46 |
| | | 1 | 47.1 | 54.2 | 1.07 | 44 |
| | | 2 | 10.1 | 11.6 | 0.94 | 52 |
| | | 5 | — | No Polymer | | |
| P | 2,3-Dimethylbutadiene | — | 21.6 | 24.8 | 2.15 | 45 |
| | | 1 | 12.0 | 13.8 | 1.25 | 46 |
| | | 5 | — | No Polymer | | |
| Q | 2,4-Hexadiene | — | 37.8 | 43.5 | 2.22 | 49 |
| | | 1 | 24.9 | 28.6 | 0.47 | 40 |
| | | 5 | 7.2 | 8.3 | 0.15 | 42 |
| | | 10 | — | No Polymer | | |
| R | Cyclopentadiene | — | 45.4 | 52.3 | 2.26 | 52 |
| | | 1 | 16.8 | 19.3 | 1.30 | 46 |
| | | 10 | 12.2 | 14.0 | (*) | 34 |

TABLE 3-continued

| Experiment Series No. | Conjugated Diolefin Name | Mol-% | Polymer Yield g. | Polymer % | RSV dl/g | Trans % |
|---|---|---|---|---|---|---|
| S | 1,3-Cyclododecadiene | — | 47.2 | 54.2 | 2.16 | 43 |
|   |   | 1 | 13.9 | 16.0 | 1.02 | 42 |
|   |   | 5 | 1.8 | 2.1 | (*) | 40 |
|   |   | 10 | 1.5 | 1.7 | Too little substance | |
| T | 1,3-Cyclooctadiene | — | 26.5 | 30.5 | 1.63 | 41 |
|   |   | 1 | 12.2 | 14.0 | 1.61 | 36 |
|   |   | 5 | 8.1 | 9.3 | 1.52 | 46 |
|   |   | 10 | 4.0 | 4.6 | 1.10 | 43 |

(*) Polymer contains insoluble components.
All RSV-values were measured at 135° C. in "Decalin."

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a catalyst system for the ring-opening polymerization of cyclic olefins consisting essentially of: (1) a tungsten or molybdenum compound; (2) an organoaluminum compound; and (3) a compound containing one or more hydroxyl or sulfhydryl groups; the improvement of (4) an ether of vinyl alcohol, allyl alcohol or 2-butene-1,4 diol, the molar ratio of component (1) to component (2) being less than 1 : 1, the molar ratio of component (1) to component (3) being about 1 : 0 to 1 : 2 and the molar ratio of component (1) to component (4) being less than 100 : 1.

2. A catalyst according to claim 1 wherein component (1) is tungsten hexachloride or tungsten oxytetrachloride.

3. A catalyst system according to claim 1 wherein component (2) is an alkyl aluminum halide.

4. A catalyst system according to claim 1 wherein component (2) is ethylaluminum dichloride, ethylaluminum sesquichloride or diethylaluminum monochloride.

5. A catalyst system according to claim 1 wherein component (4) is a phenol ether of vinyl alcohol, of allyl alcohol or of 2-butene-1,4-diol.

6. A catalyst system according to claim 5 wherein the phenol is a halogenated phenol.

7. A catalyst system according to claim 1 wherein the molar ratio of component (1) to component (4) is less than 10 : 1.

8. A catalyst system according to claim 1 wherein the molar ratio of component (1) to component (3) is about 1 : 0.1 to 1 : 2.

9. A catalyst system according to claim 1 wherein the molar ratio of component (2) to component (4) is greater than 1 : 1.

10. A catalyst system according to claim 1 wherein the molar ratio of component (1) to the difference of the amounts employed of component (2) minus the sum of components (3) and (4) is between about 1 : 1 and 1 : 4.

* * * * *